Figure 1:
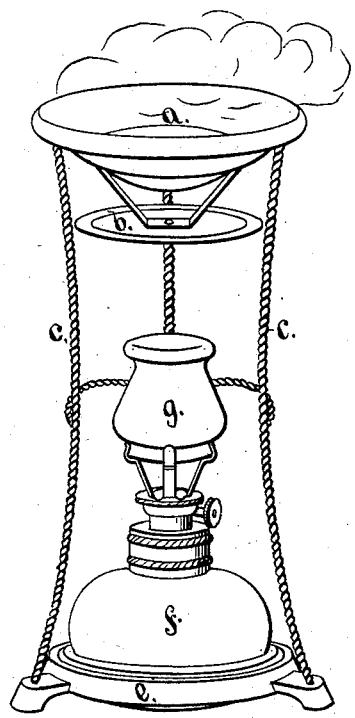

E. H. CARPENTER.
METHOD OF AND APPARATUS FOR VOLATILIZING CRESYLIC ACID.

No. 247,480. Patented Sept. 27, 1881.

WITNESSES:
William R. Cope
Joseph A. Miller Jr.

INVENTOR:
Elias H. Carpenter
by Joseph A. Miller
Atty.

UNITED STATES PATENT OFFICE.

ELIAS H. CARPENTER, OF PROVIDENCE, RHODE ISLAND, ASSIGNOR TO JAMES H. VALENTINE, OF SAME PLACE; SAID VALENTINE ASSIGNOR OF ONE-HALF TO GEORGE SHEPARD PAGE, OF STANLEY, N. J.

METHOD OF AND APPARATUS FOR VOLATILIZING CRESYLIC ACID.

SPECIFICATION forming part of Letters Patent No. 247,480, dated September 27, 1881.

Application filed September 26, 1879.

*To all whom it may concern:*

Be it known that I, ELIAS H. CARPENTER, of the city and county of Providence, and State of Rhode Island, have invented a new and useful Improvement in the Method of and Apparatus for Volatilizing Cresylic Acid; and I hereby declare that the following is a full, clear, and exact description of the same, reference being had to the accompanying drawings, forming part of this specification.

The design of my invention is to cure and mitigate certain diseases which have long resisted the efforts of the medical profession to cure or considerably alleviate, such as whooping-cough, scarlet fever, asthma, diphtheria, and other lung and throat diseases, and for other physical difficulties; also, to prevent the spread of contagious diseases, and to be used generally for the purposes of disinfection, and for other similar purposes. The sources of these diseases are supposed to be destructive germs which work injuriously in the system, producing special manifestations of diseases, and it is believed that these germs may be destroyed by the antiseptic properties contained in cresylic acid. Carbolic acid is at present used in various ways to prevent the growth of these germs, arrest putrefaction, and cure various diseases. Crude carbolic acid contains tarry matter, carbolic acid, and cresylic acid, and when volatilized the lighter portions of the crude carbolic acid are separated, leaving the more solid matter, which, when subjected to the heat of a flame, is decomposed, and produces so strong and pungent a smell that patients suffering from and weakened by disease are not able to endure it. Pure carbolic acid crystallizes under ordinary temperatures, and can only be kept in liquid form when mixed with water or other fluids. It is therefore difficult to volatilize the pure carbolic acid by the heat of a lamp in its pure state, and as its boiling-point is low—about 335°—when pure, its virtue and efficacy are liable to be greatly impaired by the heat.

One special object of this invention is to secure the antiseptic qualities or properties above specified in a liquid form at ordinary temperatures, and to volatilize the material in such way as to retain its full strength when the volatilized material is in and impregnates the air of a room for the design and purposes above expressed. I find that cresylic acid, is best capable of filling all these requirements. It is liquid at the ordinary temperature, its boiling-point is higher than pure carbolic acid its superior antiseptic qualities are indorsed by high medical authority, and it volatilizes more advantageously.

To volatilize or vaporize the cresylic acid I pour a small quantity into a cup, placing directly under the cup a deflector and under the deflector a small lamp. By this arrangement the direct heat of the flame cannot come in contact with the cup, and the cresylic acid is vaporized without the destructive effect or chemical change which would occur if the flame came in direct contact with the cup. The cresylic acid thus vaporized will fill the room, retaining its original strength and virtue, and the patient, waking or sleeping, and pursuing any ordinary habit, will inhale the air thus impregnated with this volatilized substance, thus reaching these destructive germs and removing the causes of disease, and the spread of contagion will also be prevented, and infected localities will become disinfected.

Whether the particular causes of disease above suggested are correctly assigned or otherwise, practical tests in various ways have demonstrated the utility of this material, vaporized by the process and means above shown, for the use and purposes hereinbefore expressed.

To disguise the odor of the liquid cresylic acid, I may mix small quantities of any of the essential oils with the same, preferably such as oil of lavender, of which I use about five drops to each three ounces of the cresylic acid. The oil of citronella may also be used with good effect.

The apparatus I use is shown in the drawings.

Figure 2:
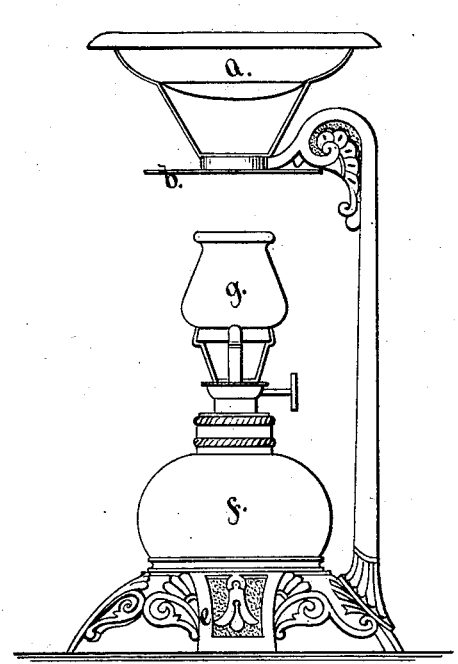

Figure 1 is a perspective view of a standard supporting a small lamp and a dish provided with a deflector. The standard is made of twisted wire. Fig. 2 is a view of a modification of the standard. It consists of a base to support the lamp and a bracket arranged to support the dish, provided with a deflector.

Various designs may be used and modifications made in the standard to suit the taste and convenience.

In the drawings, *a* represents a dish or basin secured to the standard.

*b* is a deflector secured under the dish *a*, so as to protect the dish or basin from the direct heat of the lamp.

*c c* represent the standard, which extends from the base *e* upward and supports the dish or basin. The lamp *f* rests on the base *e*, and is provided with the shade *g*, so that the apparatus may be used by an invalid at night without exposing too much light.

By having the disk interposed between the flame and the basin which contains the acid to be vaporized, and the peculiar construction of the device, an air-space is made between the disk and the bowl, and as the temperature of the disk and bowl is raised a current of air will be caused to circulate beneath the bowl and prevent any high degree of temperature, such as would decompose or destroy the medicinal properties of the cresylic acid.

This apparatus combines the use of a night-lamp and vaporizer. The wick of the lamp must be adjusted with reference to the amount of cresylic acid to be vaporized, and also so that the vaporization may proceed regularly for a fixed length of time.

If a room is to be disinfected, one or more of the devices are supplied with cresylic acid, the lamps lighted, and the room is closed. The vapor will commence to rise from the basin soon after the lamp is lighted, for the liquid cresylic acid will vaporize at a low temperature; but the amount of vapor expelled will increase as the temperature is raised, and the vapor will fill every part of a room, enter every crevice, and pass through or between every article. To do this most effectually the room should be continuously charged by refilling the basin or basins until the parts are permeated with the vapor.

To cure diseases of the respiratory organs the patient is placed in a room in which cresylic acid is being vaporized in the manner heretofore described, and is allowed to inhale the vapor mixed with the atmospheric air. I prefer to use this treatment at night when the patient sleeps; but it may be used at any other time. The cresylic acid, being vaporized without decomposing or destroying the medicinal properties of the same by heat, is inhaled by the patient in its full strength, mixed with the air of a room, so that while the antiseptic qualities are not impaired the thorough mixture of the air and vapor prevents the injurious effect that the direct application of cresylic acid would have, and it can also be readily carried through all the respiratory organs to the place where disease-germs are located, or where decomposition, ulceration, or other destructive processes are taking place, and, by destroying their progressive growth or multiplication, arrest and cure the disease. I do not limit myself, however, to the use of the particular mechanism which I have shown for the purposes of volatilization, as above set forth. I may use any similar or equivalent mechanism which will enable me to vaporize cresylic acid without changing its chemical character.

I am aware that carbolic acid has been atomized and vaporized for zymotic diseases, and that it contains more or less cresylic acid, which is well known to be the chief antiseptic and disinfecting agent in the carbolic acid; but I am not aware that cresylic acid has ever been vaporized prior to my invention without changing or impairing its value as an antiseptic or disinfectant.

Having described my invention, what I claim, and desire to secure by Letters Patent, is—

1. The method herein described for vaporizing cresylic acid and its homologues, which consists in interposing between the vaporizer and the source of heat a deflector, so that as the latter becomes heated a current of air will be caused to circulate beneath the vaporizer and prevent any high temperature, such as would impair the medicinal or healing properties of the cresylic acid, substantially as described.

2. In an apparatus for vaporizing cresylic acid, the combination of a vaporizer, a heating device, and a deflecting-plate, substantially as described.

3. The improved vaporizer hereinbefore set forth, consisting of a base adapted to be used in connection with a heating device, and having a standard or frame, to which is rigidly secured cup *a* and plate *b*, as set forth.

ELIAS H. CARPENTER.

Witnesses:
JOSEPH A. MILLER,
JOSEPH A. MILLER, Jr.